Dec. 9, 1941.  E. ORSHANSKY, JR  2,265,306
WINDSHIELD WIPER MOTOR
Filed May 22, 1940  2 Sheets-Sheet 1
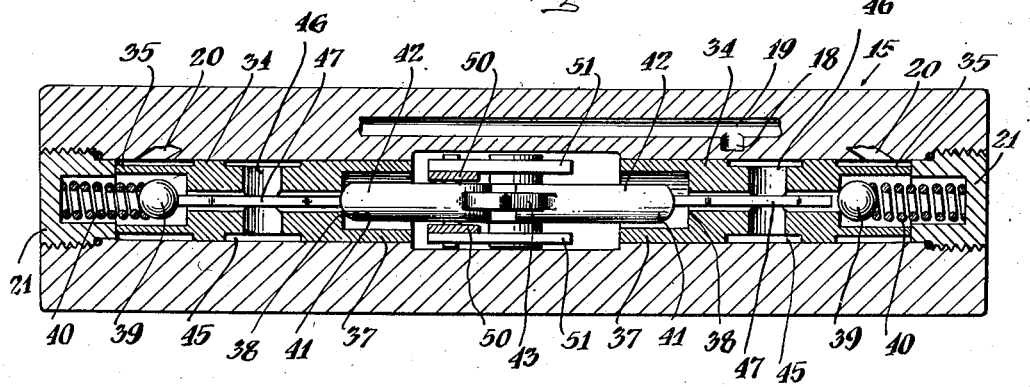
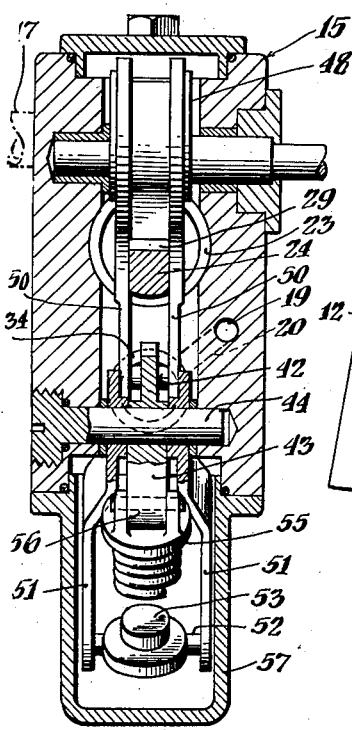
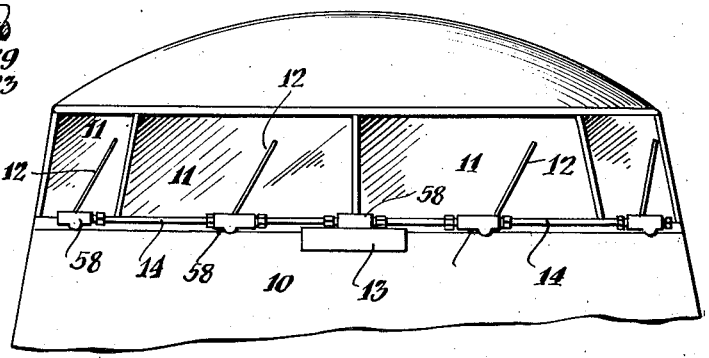
INVENTOR
Elias Orshansky, Jr.
BY
Duell, Kane & Smart
ATTORNEYS Dec. 9, 1941.    E. ORSHANSKY, JR    2,265,306
WINDSHIELD WIPER MOTOR
Filed May 22, 1940    2 Sheets-Sheet 2

INVENTOR
Elias Orshansky, Jr.
BY
Duell, Kane & Smoot
ATTORNEYS

Patented Dec. 9, 1941

2,265,306

UNITED STATES PATENT OFFICE 2,265,306

WINDSHIELD WIPER MOTOR

Elias Orshansky, Jr., University Heights, Ohio, assignor to The Acrotorque Company, Cleveland, Ohio, a corporation of Connecticut Application May 22, 1940, Serial No. 336,567

13 Claims. (Cl. 121—164)

This invention relates to a structurally and functionally improved motor and assembly, capable of use in numerous different associations, but primarily intended for employment as a windshield wiper actuating mechanism. Viewed in its more specific aspects, the present invention aims to provide a windshield wiper assembly which will be ideally adapted for use in connection with vehicles, and especially airplanes, in order to maintain a windshield sufficiently free from moisture or other deposits so that the pilot, navigator, gunner or others requiring a clear vision, will have a substantially unobstructed field of vision.

It is an object of the invention to furnish an apparatus of this character which will be extremely light and compact.

A further object is that of furnishing a unit which will develop a relatively great amount of power so that the operator may be assured of proper functioning of the apparatus, despite high wind pressures, rapid accumulation of sleet or snow or any other conditions which would impose a relatively great resistance to the operation of wiper blades arranged in contact with the exterior face of the windshield panels.

A still further object is that of providing a windshield assembly including a motor and which will lend itself to manufacture of non-magnetic materials so that—if installed in an airplane—no interference will be created between the assembly and, for example, the magnetic compass of the vehicle.

Another object is that of furnishing a motor which will be ideally suited for use in connection with pressure apparatus, and specifically oil pump or pressure sources as currently provided in aircraft, and which motor will consume a relatively small amount of fluid in its operation. Accordingly, the size of the pump customarily available will not have to be increased incident to employing this unit in aircraft or any equivalent vehicle.

Still another object is that of constructing a motor which will have adequate speed of operation so that the windshield wiper blades or other units coupled to the same will function with sufficient frequency to maintain unobstructed vision, and even although severe weather conditions are encountered.

An additional object is that of furnishing an apparatus of this nature which will embody a structure such that it may be subjected to every duty with assurance that it will function with entire freedom from difficulty and throughout the entire period during which it is desired to operate the motor. Moreover, within the province of the present invention, it will be feasible to modify the design of the present unit in a manner such that it may readily be adapted for use in associations less exacting than aircraft installations.

With these and other objects in mind, reference is had to the attached sheets of drawings, illustrating one practical embodiment of the invention, and in which:

Fig. 1 is a rear view of the forward or windshield end of an airplane cockpit and showing the apparatus installed therein;

Fig. 4 is a sectional plan view taken along the lines 4—4 and in the direction of the arrows, as indicated in Fig. 3; and Fig. 5 is a transverse sectional view taken along the lines 5—5 and in the direction of the arrows, as also indicated in Fig. 3.

Figure 2:
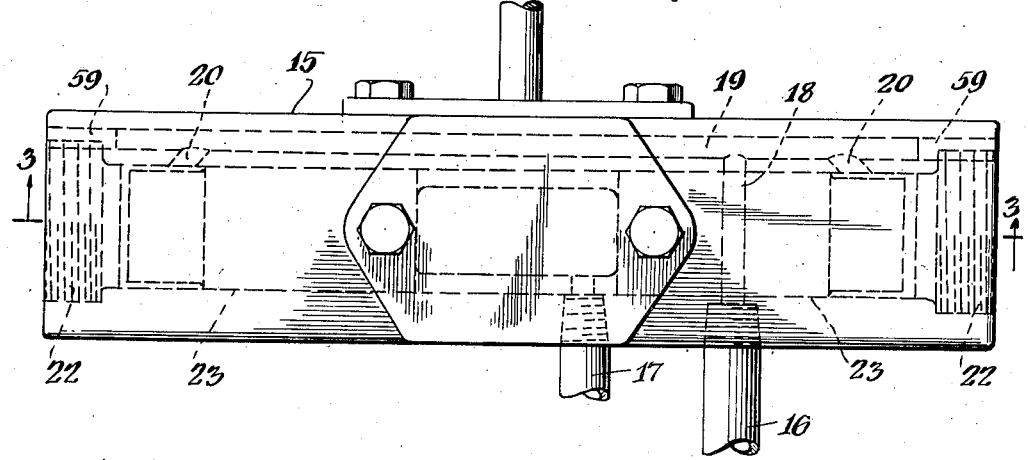
Fig. 2 is a plan view of the motor unit.

Referring primarily to Fig. 1, it will be seen that the apparatus has been shown as applied to the cockpit of an airplane. Obviously it could be installed in numerous other associations and also applied to vehicles other than aircraft. Regardless of its application, however, it is preferred that the present motor operate incident to being coupled to a source of fluid pressure, and especially liquid such as oil. With this in mind, any convenient source of liquid pressure may be tapped, such as oil lines extending from or auxiliary to the main motors or supplemental units which are associated with the vehicle.

Thus, in Fig. 1, numeral 10 indicates the body of the fuselage provided with windshield panels 11, beyond which are mounted wiper blades 12 of any desirable type. These blades are commonly mounted by arms attached to shafts which extend through the wall of the cockpit or the windshield frame. As shown, the motor 13 may conveniently be disposed within the crotch of the V formed at the zone of juncture of the two central panels 11, and serves to reciprocate by, for example, a rack and pinion, a suitable push-pull control 14 such as an "Arens" control. The latter, by means of further racks and pinions, serves, in a manner well known to those skilled in the art, to oscillate the shafts to which the wiper arms are coupled. None of these rack and pinions have been shown, in that such mechanism is well known to those skilled in the art. For the purpose of avoiding undue illustration, the numeral 58 has been employed to designate the casing portions associated with both the motor 13 and the controls 14, and which serve to house these rack and pinion assemblies, or their functional equivalent.

Regardless of the number of blades, or their particular place of installations, it is preferred that they be disposed so that they will balance each other. In other words, as shown in Fig. 1, a similar number of blades is disposed to each side of the leading edge of the cockpit. As a consequence, while one blade will work against the slip stream, a corresponding blade will be moving in the direction of such slip stream. Accordingly, minimum power will be required to oscillate or reciprocate the blades.

Referring to the motor proper, as especially shown in Figs. 2 to 5, it will be observed that this includes a body 15 formed, for example, of metal, and having an inlet port to which a high pressure line 16 is connected, and an outlet port to which a low pressure or venting line 17 is coupled. Communicating with the port to which the line or tube 16 is coupled is a passage 18 which communicates with a passage 19, having its outer ends closed, and which may extend throughout the length of body 15. Short of the ends of passage 19 branch passages 20 are provided, and these communicate with a valve-accommodating bore, the ends of which may be sealed by, for example, plugs 21.

As will hereinafter be apparent, the valve and other mechanisms are, in many respects, mere duplications of each other. With a view to avoiding unnecessary and duplicate reviews, only one set of these mechanisms will be described. Accordingly, it will be observed that the body 15 is formed with a bore to one side, or preferably above the bore which accommodates the valve mechanism. This bore has its ends closed by plugs 22 and mounts liner members 23, providing, in effect, a pair of cylinders within which pistons reciprocate. The latter assembly includes a double ended piston 25—26, coupled by a body or bar portion 24. Each of these ends embrace cup shaped members 27 which bear against the thickened or enlarged ends of bar 24 as a consequence of being secured in position by, for example, nuts 28. The rod or bar 24 presents a rack portion 29, the teeth of which mesh with a segmental gear 30 secured against movement with respect to a shaft 31.

The latter is coupled as, for example, by the rack and pinion, within the casing 58, associated with the motor casing 13 to the push-pull control 14. Accordingly, as the pistons 25—26 reciprocate, shaft 31 will be oscillated to effect the desired movement of the wiper blades 11 or other elements to be driven thereby.

The outer ends of the liners 23 or any equivalent structure providing the cylinders are reduced, as indicated at 32 to provide a passage for the flow of liquid from a point exteriorly of the cylinders to the interior of the same. Passages 33 extend from the reduced ends or channel portions of the cylinders to the bore which accommodates the valve mechanism, and it is through these passages that the liquid flows towards and away from the cylinders.

Within the bore, closed by plugs 21, are members 34, which fill this bore. Adjacent their outer ends, these members are reduced to provide a tube portion 35 which, in conjunction with the wall of the bore, provides a channel communicating with passages 20. This tube portion is formed with openings 36, and the members 34 are formed with longitudinally extending bores affording communication between the tube portions 35 and the cup shaped inner ends 37 of such members.

Adjacent the forward and rear ends of the bores, seat portions 38 are provided. The forward seat portions are engaged by valves which may be in the form of spheres 39 and which are yieldingly urged towards their seat portions by springs 40. The latter are interposed between the plugs 21 and the valve bodies.

The rear seats 38 may be engaged by valve portions 41 forming a part of plungers 42. The latter are mounted for reciprocation with respect to the body of the motor and are engaged by a rocker arm 43 pivotally supported upon a shaft 44. At this time, it is to be noted that the passages 33 conveniently communicate with channels 45 formed in the exterior of members 34. These channels, by means of openings 46, communicate with the bores of these members. Within the latter are positioned rods 47 of a configuration such that they do not prevent the flow of fluid through these bores. In other words, they are of less area and/or of different outline from the bores. In any event, however, the rods 47 have a length sufficiently great that one end thereof projects from the corresponding end of the bore when the opposite end of the rod is housed within such bore. Accordingly, with the valve 39 seated, valve portion 41 will be unseated. Conversely, with the latter valve portion seated, the sphere 39 will be unseated.

Secured to shaft 31 are one or more eccentric discs 48 which are encircled by followers 49. These are continued in the form of connecting rods 50 which are pivotally coupled to the shortarms of bell crank levers 51. The latter support between them a pin 52 carrying a mounting member 53 with which the lower end of a spring 54 is associated. The upper end of this spring engages a second mounting member 55 supported by a pin 56 carried by the rocker arm 43.

Figure 3:
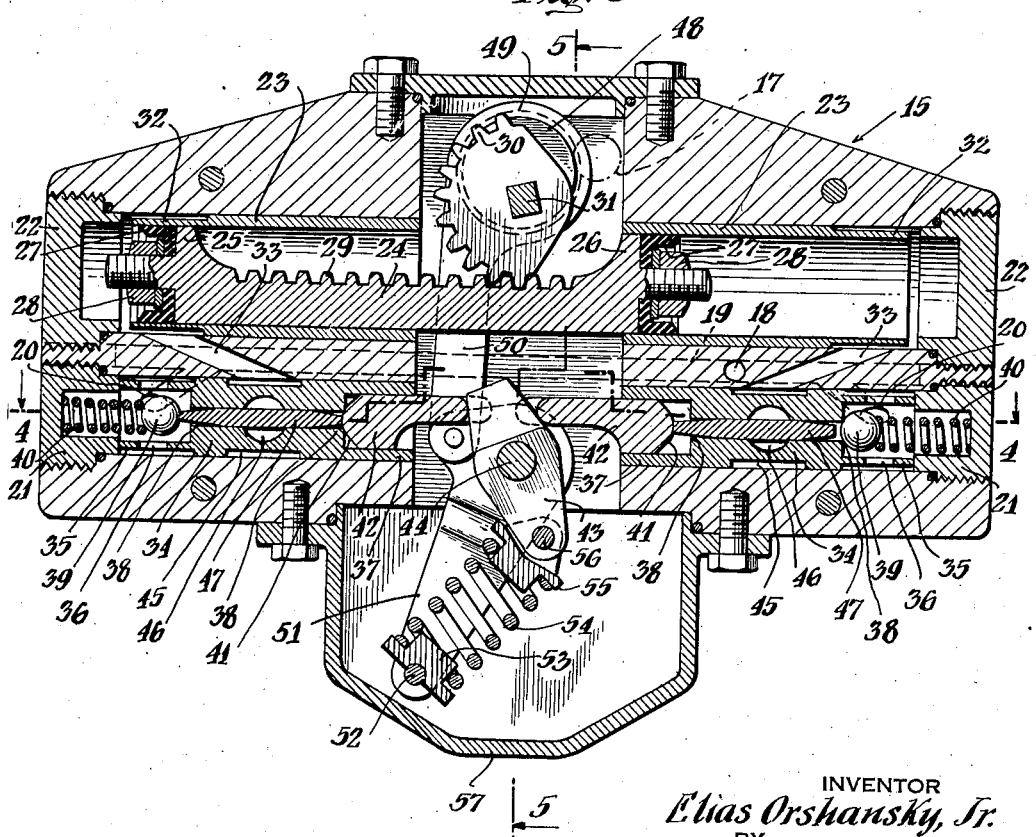
Fig. 3 is a sectional side view thereof, taken along the lines 3—3 and in the direction of the arrows, as indicated in Fig. 2.

Thus, a spring cradle is furnished, and it is to be noted that the parts are so disposed and proportioned that if, as viewed in Fig. 3, the bell crank levers 51 are shifted to the right, the axis of spring 54 will assume a position alined with respect to the axis of rocker arm 43. Continued movement will cause the parts to move past dead center and the action of spring 54 will, thereupon, snap or rock arm 43 to its opposite extreme position. This will cause plungers 42 to be shifted.

In utilizing an apparatus of this character, the latter is—as afore brought out—coupled to a source of pressure through line or tube 16. The line, or tube, 17 may connect to a suitable reservoir which receives the fluid distributed from the motor. A valve (not shown) will be interposed in one of these lines, and preferably line 16.

If now, fluid under pressure is permitted to flow through line 16, it will pass through passage 18 into passage 19, and thence into passages 20. Assuming that the parts are in the position shown in Fig. 3, such fluid will enter through the channel portions of the bore and openings 36 into the interior of the tube portions 35. The valve 39, in the right-hand tube portion, being closed, fluid will not, under these circumstances, flow beyond this point. However, the corresponding valve 39 at the left-hand side of the bore being unseated, incident to the position of rod 47, fluid will flow through the bore of member 34, and thence through openings 46 and passage 33 to the lefthand cylinder portion to act against piston 25. Accordingly, the fluid under pressure will act to force the piston to the right, as viewed in this figure.

Such movement will be permitted because fluid within the cylinder, within which piston 26 is disposed, will flow past the channel portion defined by the reduced part 32 of liner 23, through channel 33 and opening 46, through the bore of member 34, past the seat 38 and the adjacent plunger 42 and so into the space defined by the cap 57, and within which the spring cradle is situated. At this time, it will be understood that such flow is permitted because the plungers 42 do not fill the areas of the cup portion 37, but rather a flow of fluid between these parts may occur when the valve portion 41 is unseated.

With the pistons 25—26 moving, it is apparent that shaft 31 will be rotated to correspondingly actuate the parts to be driven thereby. Simultaneously, it will shift the followers 49 to rock the bell crank levers providing the spring cradle. Such rocking—as afore brought out—will cause the parts to shift to a point at which the rocker arm 43 will effect a shifting of the plungers 42. Under such circumstances, the valve portion 41 of the right-hand plunger will be shifted into engagement with the seat 38, to thus shift the rod 47. This, in turn, will unseat the valve member 39. Under these circumstances, the cylinder within which piston 26 moves will no longer be vented, but will instead be connected to a source of fluid pressure. Conversely, the cylinder within which piston 25 moves will be vented to the outlet port to which line 17 is connected and will no longer be connected to the source of fluid pressure.

In any event, it will be understood that the spring cradle, or spring 54, will assert such force as to definitely seat the actuators and valve portions 41. Also, the power of this unit will be such that it will effectively unseat the valves 39 against the action of springs 40. The latter merely serve to urge valves 39 in seated positions, in the event that the actuating rods do not prevent this. It will also be understood that the seating of such latter valves is induced by the pressure of the fluid entering through the inlet port passages and channels.

It will be appreciated that the afore described cycle will be repeated until the flow of fluid through the motor unit has been interrupted. With a structure, such as that illustrated and described, it is found that with a relatively small unit, as for example 6½" in length by 3" x 1½", it is feasible to develop $\frac{3}{10}$ of a horsepower. Only $\frac{7}{10}$ gallons per minute of liquid will be employed and this liquid may conveniently be at 800 pounds pressure. While, of course, many different types of liquid may be utilized, it has been found that low viscosity, airplane hydraulic system oil, conforming to U. S. Army specification 3580, or the equivalent, is ideally suited to the operation of the device.

In conclusion, it will be noted that as afore brought out the action of the valves is quite rapid. In other words, incident to the spring cradle one valve will be rapidly opened and another valve similarly closed upon the piston reaching a predetermined position. Consequently, there will be no lag in the valve action. Aside from the generally desirable nature of this characteristic, it is to be appreciated that such action is especially necessary where pressures of the present value are being employed.

Also, as a consequence of the fact that the valves as shown and described herein are preferably of a nature such that they provide a "line-seal," no effective leakage can occur despite the high pressures which are employed. In other words, the valves present surfaces which are preferably machined or are otherwise of a true nature. The seats with which these bodies cooperate, conveniently present edge portions which are relatively thin and which contact the valve bodies throughout the entire effective zone of the latter when such bodies are in seated condition. Therefore,—and with the valves being rapidly seated as afore brought out—the fluid film between the valve bodies and seats is ruptured. Consequently, no effective seepage of any value can occur with any given valve closed. This, as will be appreciated, is especially desirable in order to provide an efficient apparatus capable of being operated by fluid under high pressure.

From the foregoing, it will be understood that among others the several objects of the invention, as specifically aforenoted, are achieved. It will also be understood that the present motor may be employed for numerous different purposes other than that of merely operating windshield wiper blades. Obviously numerous changes in construction and re-arrangements of the parts might be resorted to without departing from the spirit of the invention, as defined by the claims.

And now, having described my invention, what I claim is:

1. A windshield wiper motor including a body formed with a cylinder bore, a piston reciprocating within said bore, a shaft operatively connected with said piston to move in response to movements of the same, said body being formed with passages for the flow of fluid under pressure and for the distribution of such fluid, a pair of valves for regulating the admission and discharge of the fluid from the cylinder, means providing spaced seats for said valves and a bore extending between said seats, an actuating element slidably mounted in said bore and engageable with said valves said element having a length in excess of the distance separating said seats, whereby with one valve seated, the element will project beyond the seat of the second valve to maintain the latter in unseated position, spring means, a further shaft for supporting said spring means, the latter being biased to shift to one of two extreme positions around said further shaft, said spring means in one of said positions being co-operable with said element to shift the same and means for coupling said spring means to be responsive to piston movements.

2. A windshield wiper motor including a body formed with a cylinder bore, a piston reciprocating within said bore, a shaft operatively connected with said piston to move in response to movements of the same, said body being formed with passages for the flow of fluid under pressure and for the distribution of such fluid, a pair of valves for regulating the admission and discharge of the fluid from the cylinder, means providing spaced seats for said valves and a bore extending between said seats, an actuating element slidably mounted in said bore and engageable with said valves said element having a length in excess of the distance separating said seats, whereby with one valve seated, the element will project beyond the seat of the second valve to maintain the latter in unseated position, spring means, a further shaft for supporting said spring means, the latter being biased to shift to one of two extreme positions around said further shaft, said spring means in one of said positions being co-operable with said element to shift the same and a crank also mounted on said further shaft and connecting said spring means with said piston whereby in response to movements of the latter the former will be shifted.

3. An apparatus of the character described including a body formed with a cylinder bore, a piston reciprocating within said bore, said body being formed with passages for the flow of fluid under pressure and for the distribution of such fluid, a pair of valves for regulating the admission and discharge of the fluid from the cylinder, means providing spaced seats for said valves, an actuating element engageable with said valves and having a length in excess of the distance separating said seats, whereby with one valve seated, the other of the same will be unseated, spring means biased to shift to one of two extreme positions and co-operable with said element to shift the same, a shaft connected for movement in response to movements of said piston, an eccentric coupled to said shaft and means connecting said eccentric with said spring means to shift the latter as said shaft moves.

4. An apparatus of the character described including a body formed with a bore, a pair of cylinder liners disposed within said bore, a shaft rotatably mounted by said body, pistons disposed within said cylinders, means coupling said pistons to have synchronized movements, said shaft being connected to said last named means, said body being formed with passages through which fluid may flow to and away from said cylinders, members interposed in said passages and providing spaced valve seats, valves co-operative with said seats, valve actuating elements of a length greater than the spacing between said seats and to engage said valves to automatically permit a seating of one valve while unseating a second valve, a spring cradle placed to assume one of two extreme positions, an actuator coupled to said cradle and connected to certain of said valves to shift the latter and said elements, and means coupling said cradle to said shaft to be shifted in response to movements of the latter.

5. An apparatus of the character described including a body formed with a bore, a pair of cylinder liners disposed within said bore, a shaft rotatably mounted by said body, pistons disposed within said cylinders, means coupling said pistons to have synchronized movements, said shaft being connected to said last named means, said body being formed with passages through which fluid may flow to and away from said cylinders, members interposed in said passages and providing spaced valve seats, valves co-operative with said seats, valve actuating elements of a length greater than the spacing between said seats and to engage said valves to automatically permit a seating of one valve while unseating a second valve, a spring cradle placed to assume one of two extreme positions, an actuator coupled to said cradle and connected to certain of said valves to shift the latter and said elements, an eccentric secured to said shaft, a follower associated with said eccentric and said follower being connected to said cradle whereby as said shaft moves said cradle will be shifted.

6. A windshield wiper motor to be operated by fluid under high pressure, said motor including a body formed with a pair of bores extending substantially parallel to each other, one of said bores providing a pair of opposed cylinders, the other of said bores furnishing valve chambers, said body being moreover formed with passages extending from said chambers to points adjacent the outer ends of said cylinders and also with a fluid-supplying manifold lying substantially parallel to said bores and connected by passages with said chambers, pistons to move in synchronism and disposed one within each of said cylinders, valve assemblies arranged within said chambers, a shaft connected to said pistons and to be moved thereby, valve actuating means for said assemblies and means whereby said actuating means is connected to move in response to the movement of said pistons.

7. A windshield wiper motor to be operated by fluid under high pressure, said motor including a body formed with a pair of bores extending substantially parallel to each other, one of said bores providing a pair of opposed cylinders, the other of said bores furnishing valve chambers, said body being moreover formed with passages extending from said chambers to points adjacent the outer end of said cylinders and also with fluid supplying passages connected to said chambers adjacent their outer ends, a shaft connected to said pistons and to move in response to movement of the latter, a valve actuating means also connected to move in response to piston movement and valve assemblies disposed one within each of said chambers and arranged to function in response to movements of said actuator and to permit fluid to flow from said fluid supplying passages to said cylinders and from the latter back to said valve chamber bore.

8. A windshield wiper motor to be operated by fluid under high pressure, said motor including a body formed with a pair of bores extending substantially parallel to each other, one of said bores providing a pair of opposed cylinders, the other of said bores furnishing valve chambers, said body being moreover formed with passages extending from said chambers to points adjacent the outer ends of said cylinders and also with fluid supplying passages connected to said chambers adjacent their outer ends, a shaft connected to said pistons and to move in response to movement of the latter, a valve actuating means also connected to move in response to piston movement, members providing valve seats disposed one within each of said bores, valves cooperable with said seats and adjacent opposite ends of said members, said actuator acting against the innermost of said valve members for shifting the same and an actuating element mounted by each of said members and of a length greater than the distance between said seats, said elements engaging the outermost valves within said chambers whereby one of the valves in each assembly is maintained in unseated position when the other valve of said assembly is in seated position and whereby, at no time, will fluid be prevented from flowing past one of said valve seats.

9. A windshield wiper motor to be operated by fluid under high pressure, said motor including a body formed with a pair of bores extending substantially parallel to each other, one of said bores providing a pair of opposed cylinders, the other of said bores furnishing valve chambers, said body being moreover formed with passages extending from said chambers to points adjacent the outer ends of said cylinders and also with fluid supplying passages connected to said chambers adjacent their outer ends, a shaft connected to said pistons and to move in response to movement of the latter, a valve actuating means also connected to move in response to piston movement, members providing valve seats and disposed one within each of said chambers, valves cooperative with the outermost of said seat and providing in conjunction therewith "line seals", said valves being disposed adjacent said fluid supplying passages, further valves cooperative with the seats adjacent the inner ends of said members, said actuator cooperating with said further valves to shift the same, means for maintaining one of said valves in unseated position when the other valve is seated and whereby, at no time, will fluid be prevented from flowing past one of said valve seats.

10. A windshield wiper motor to operate with fluid under high pressure, said motor including a body formed with a pair of bores extending substantially parallel to each other, one of said bores providing a pair of opposed cylinders, the other of said bores furnishing valve chambers, said body being moreover formed with passages extending from said chambers to points adjacent the outer ends of said cylinders and also with fluid supplying passages connected to said chambers adjacent their outer ends, a shaft connected to said pistons and to move in response to movement of the latter, a valve actuating means also connected to move in response to piston movement, members providing valve seats and disposed one within each of said chambers, valves cooperative with the outermost of said seat and providing in conjunction therewith "line seals", said valves being disposed adjacent said fluid supplying passages, further valves cooperative with the seats adjacent the inner ends of said members, said actuator cooperating with said further valves to shift the same, said members being formed with bores extending between said seats, valve actuating elements slidably mounted within said bores, said elements having a length greater than the distance between said seats and engaging said valves and whereby, at no time, will fluid be prevented from flowing past one of said valve seats.

11. A windshield wiper motor to operate with fluid under high pressure, said motor including a body formed with a pair of bores extending substantially parallel to each other, one of said bores providing a pair of opposed cylinders, the other of said bores furnishing valve chambers, said body being moreover formed with passages extending from said chambers to points adjacent the outer ends of said cylinders and also with fluid supplying passages connected to said chambers adjacent their outer ends, a shaft connected to said pistons and to move in response to movement of the latter, a valve actuating means also connected to move in response to piston movement, members providing valve seats and disposed one within each of said chambers, valves cooperative with the outermost of said seats and providing in conjunction therewith "line seals", said valves being disposed adjacent said fluid supplying passages, further valves cooperative with the seats adjacent the inner ends of said members, said actuator cooperating with said further valves to shift the same, means for maintaining one valve in unseated position when the other valve is seated and whereby, at no time, will fluid be prevented from flowing past one of said valve seats, said members being formed with bores affording communication between said seats and also with the inner ends of the passages extending between said cylinders and chambers.

12. A windshield wiper motor including a body formed with a bore providing a pair of cylinders, pistons connected to each other and disposed one within each of said cylinders, a shaft operatively coupled to said pistons and to move in response to their movement, said body being formed with valve chambers, passages extending from said chambers to said cylinders and further passages extending from said chambers to the exterior of said body, said further passages adapted to be coupled to a source of liquid under high pressure, valve assemblies within each of said chambers, valve actuating means operatively connected with said pistons and to function in response to movement of the latter, means for maintaining said assemblies at all times in a condition such, that a flow of liquid occurs through said assemblies and towards or away from said cylinders and said body being formed with an outlet opening adjacent said shaft whereby liquid will flow past and lubricate said pistons, valve assemblies and shaft before being discharged from said body.

13. A windshield wiper motor to be operated by fluid under high pressure, said motor comprising a body formed with cylinders and bores at points short of said cylinders and to receive valve assemblies as well as fluid supplying passages connected with said bores and further passages extending from said bores to said cylinders, valve assemblies arranged within said bores, valve actuating mechanism extending to points short of said bores and cooperative with said assemblies to permit fluid to flow from said fluid-supplying passages to said cylinders and from said cylinders to said valve actuating mechanism, pistons within said cylinders, a shaft beyond said pistons and connected to operate in response to movement of the latter and said body being formed with an outlet opening at a point substantially adjacent said shaft whereby, the fluid in addition to causing operation of said pistons will circulate past and lubricate the latter, said valve assemblies, valve actuating mechanism and the connection between said shaft and said pistons prior to its discharge from said body.

ELIAS ORSHANSKY, Jr.